United States Patent [19]

Ceragioli et al.

[11] Patent Number: 5,725,063
[45] Date of Patent: Mar. 10, 1998

[54] ARTICULATED WORK VEHICLE

[75] Inventors: Alfred A. Ceragioli, Chicago; William L. Schubert, Downers Grove, both of Ill.

[73] Assignee: Case Corporation, Wis.

[21] Appl. No.: 514,662

[22] Filed: Aug. 14, 1995

[51] Int. Cl.$^6$ ................................................. B60K 17/00
[52] U.S. Cl. ...................... 180/14.4; 180/418; 180/235
[58] Field of Search ........................... 180/235, 420, 180/418, 134, 136, 14.4

[56] References Cited

U.S. PATENT DOCUMENTS

| | | |
|---|---|---|
| 2,872,993 | 2/1959 | Toth . |
| 3,007,590 | 11/1961 | Mathew et al. ............... 180/235 |
| 3,167,147 | 1/1965 | Symons et al. ............... 180/235 |
| 3,237,790 | 3/1966 | Kampert et al. . |
| 3,240,284 | 3/1966 | Finneman ..................... 180/420 |
| 3,246,778 | 4/1966 | Kampert et al. . |
| 3,312,301 | 4/1967 | Hagen . |
| 3,338,329 | 8/1967 | Orth . |
| 3,349,864 | 10/1967 | Wagner ........................ 180/235 |
| 3,367,437 | 2/1968 | Garrett . |
| 3,451,494 | 6/1969 | Kowalik . |
| 3,701,393 | 10/1972 | Lemons et al. ............... 180/235 |
| 3,773,129 | 11/1973 | Anderson ..................... 180/235 |
| 3,828,882 | 8/1974 | Biskup . |
| 4,019,598 | 4/1977 | Fresmann et al. ............ 180/418 |
| 4,073,364 | 2/1978 | Schmidt ........................ 180/420 |
| 4,081,046 | 3/1978 | Stone ............................ 180/235 |
| 4,310,061 | 1/1982 | Khanna et al. . |
| 4,356,878 | 11/1982 | Kestian et al. . |
| 4,400,896 | 8/1983 | Jeanson . |
| 4,771,851 | 9/1988 | Nystuen et al. . |
| 4,802,545 | 2/1989 | Nystuen et al. . |
| 5,269,389 | 12/1993 | Tomiyoshi et al. . |

*Primary Examiner*—Brian L. Johnson
*Assistant Examiner*—Gary Savitt
*Attorney, Agent, or Firm*—Foley & Lardner

[57] ABSTRACT

A work vehicle includes an articulation joint between a front section and a rear section. The articulation joint comprises two vertically spaced pivotal support bearings defining a rotational axis of the joint. First and second drive trains extend through the joint for transmitting drive power between the front and rear sections of the vehicle. Steering actuators which are coupled between the front and rear sections for selectively articulating the joint are trunnion-mounted, providing a compact articulation joint. Free volumes are provided adjacent to cap ends of the actuators to allow for pivotal movement of the steering actuators during articulation of the joint. The first drive train extends between an engine in one section of the vehicle and a transmission in the other section for driving the transmission and a first set of wheels, while the second drive train extends from the transmission to the first section of the vehicle for driving a second set of wheels. Each drive train is positioned in a common plane with mating power transmission elements in the front and rear sections of the vehicle. The first drive train is positioned between the support bearings and the second drive train is positioned below both support bearings.

13 Claims, 3 Drawing Sheets

ARTICULATED WORK VEHICLE

BACKGROUND OF THE INVENTION

The present invention relates generally to articulated work vehicles such as agricultural tractors. More particularly, the invention relates to an arrangement of the steering system and drive train elements in an articulation joint between sections of such vehicles that provides for more efficient power transmission through the articulation joint, reduces the overall volume occupied by the articulation joint, and improves ground clearance at the articulation joint.

In the field of articulated work vehicles, it has long been known to provide a steering system, wherein the front section of the vehicle is pivotally connected to the rear section of the vehicle at an articulation joint, generally at an intermediate location along the longitudinal axis of the vehicle. Such articulation joints allow relative angular movement of one section of the vehicle relative to the other about the joint and afford tight-radius steering. Articulated work vehicles of this type incorporating such steering systems include farm tractors, crawlers, earth-moving machines, loader backhoes and the like. In such steering systems, articulation joints are configured to include a pair of hydraulic steering cylinders extending between front and rear sections of the vehicle, and a vertical structure pivotally joining the front and rear sections of the vehicle. The structure supports bearing and other loads exerted at the articulation joint and resists bending moments imparted by, among other things, the weight of the front and rear sections of the vehicle.

By way of example, an articulated work vehicle generally of this type is shown in U.S. Pat. No. 3,237,790, issued to Kampert et al. on Mar. 1, 1966. The vehicle generally comprises a front frame and a rear frame hingedly connected together to allow relative angular movement about a vertical pivot axis. Steering control is accomplished by means of a conventional hydraulic steering system with suitable connections to actuate steering rams in a cooperative fashion to effect angular movement of the front frame relative to the rear frame in response to movement of a steering wheel in an operator station.

Examples of steering control systems for articulated work vehicles are described in commonly assigned U.S. Pat. No. 4,771,851 and U.S. Pat. No. 4,802,545. Generally, in such steering control systems small directional changes are achieved solely through movement of a steering axle (i.e. movement of an axle relative to one frame portion and affecting only one set of wheels) whereas for larger directional changes a hydraulic actuator pivotally articulates one frame portion relative to the other about an articulation joint. As disclosed in such patents, such steering control systems may be actuated by a hydraulic system under control of a microcomputer to support fully articulated steering.

Several increasingly important considerations in modern articulated work vehicles have imposed design constraints on conventional articulation joints. First, as the horsepower of such vehicles is increased, the articulation joint and associated elements, including the steering cylinders, are subjected to greater forces. Second, in order to maintain a minimum overall vehicle wheelbase, which is particularly desirable in agricultural tractors, the overall length of, and volume encompassed by the envelope of the articulation joint, including the steering cylinders, must be kept to a minimum. Moreover, because the engine is often located in one section of the vehicle (typically the front section for agricultural tractors) while the transmission (and in a conventional vehicle the drive axle) is located in the second section of the vehicle, the articulation joint must be configured to accommodate the elements of a drive train from one section to the other.

In an effort to reduce bending stresses by distributing bending moments at the articulation joint over a large vertical area while permitting the passage of a drive train through the articulation joint, it has become common to configure the articulation joint to include an upper and a lower pivotal bearing, each sharing a common vertical axis. An articulation joint of this type is described in U.S. Pat. No. 4,356,878, issued to Kestian et al. on Nov. 2, 1982.

In articulated vehicles employing the increasing popular option of front-wheel drive or four-wheel drive to supplement conventional rear-wheel drive, the articulation joint must accommodate drive train elements not only to transmit power from the engine to the transmission but also from the transmission to a front axle. Articulation joints permitting passage of front and rear drive trains have also been proposed, such as in U.S. Pat. No. 4,356,878, mentioned above. In U.S. Pat. No. 4,356,878, the articulation joint disclosed includes two hinge points or pivotal bearings vertically separated along the joint rotational axis. Two clevis-mounted steering cylinders are provided for articulating the front and rear sections of the vehicle about the axis of articulation (i.e. at the articulation joint). A first drive train runs horizontally from the engine, which is located in the front section, through the articulation joint on a level between a set of hinge points and further to the transmission, located in the rear section. A second drive train runs from the transmission at a downward incline through the articulation joint to reach the lower level of the front axle driving gears. The second drive train passes through the articulation joint at a point below the first drive train but still above the lower of the two hinge points.

In another approach to articulating a work vehicle, clevis-mounted cylinders, pivotally supported at the end of the cylinder barrel, have in hydraulic steering systems for articulated vehicles been replaced with trunnion-mounted cylinders, pivotally supported at an intermediate position along the length of a cylinder barrel. Trunnion-mounted cylinders effectively obtain a comparable cylinder extension length within a smaller overall length envelope. However, because typical trunnion-mounted steering cylinders require free clearance for pivotal movement (i.e. sweep) of the cap end of the cylinder barrel extending beyond the trunnions that would otherwise interfere with other structures or drive train elements, they have not gained widespread acceptance, except in large tractor scrapers where such clearance is less important and where other drive train elements and structure can be configured so as not to interfere with movement of the end of the cylinder barrel. Moreover, because such large articulated vehicles typically do not transmit drive power through the articulation joint, interference between the steering cylinders and other drive train elements is generally not an issue, as it is in the case of smaller articulated vehicles such as agricultural tractors.

Notwithstanding the advances in the art, there remains a demand for an articulation joint configuration that provides the advantages of reduced length and volume envelopes for the steering cylinders, while retaining the sweep and strength of a conventional joint. In addition, there is a need for a compact articulation joint that affords an efficient passage of drive power both rearwardly and forwardly through the joint.

SUMMARY OF THE INVENTION

The invention features a novel structure for an articulation joint for articulated work vehicles, allowing relative angular movement of one section of such a vehicle relative to another section of the vehicle, designed to respond to these needs. According to one preferred embodiment described below, the articulation joint includes a pair of trunnion-mounted steering cylinders, each supported by a bearing that pivotally supports a steering cylinder at an intermediate position along its length, reducing the overall length and volume envelope size of the joint, and thus allowing each cylinder a free pivotal sweep that avoids interference with other components of the vehicle, such as the engine, transmission, frame, and elements of the drive train, during articulation. This feature is particularly advantageous for small and medium horsepower tractors provided with all-wheel or four-wheel drive, in which case a compact design of the articulation joint accommodating the respective drive trains is particularly desirable. In another preferred embodiment, the articulation joint encompasses a pair of drive shafts for transmitting power rearwardly and forwardly substantially in line with drive train components, including the engine, transmission and other drive train elements.

Thus, in accordance with a first aspect of the invention, an articulation joint for a work vehicle such as a tractor includes a pair of pivotal support bearings, a drive train and a pair of steering cylinders. The support bearings share a common, substantially vertical rotational axis that defines the rotational axis of the joint. The drive train extends through the joint for transmitting drive power between front and rear sections of the vehicle. The steering cylinders coupled between the front and rear sections of the vehicle for selectively articulating the joint are trunnion-mounted.

In accordance with a further aspect of the invention, an articulation joint for a work vehicle includes first and second pivotal support bearings, first and second drive shafts and a pair of steering cylinders. The first and second support bearings share a common, substantially vertical rotational axis defining the rotational axis of the joint. The first and second drive shafts serve to transmit power between the front and rear sections of the vehicle. The first drive shaft lies substantially in a first common horizontal plane with remaining first drive train elements in the front and rear sections of the vehicle, and the second drive shaft lies substantially in a second common horizontal plane with remaining second drive train elements in the front and rear sections, wherein the first and second planes are vertically spaced from one another and substantially perpendicular to the rotational axis.

In accordance with a further aspect of the invention a work vehicle having an articulation joint between front and rear sections of the vehicle is provided, wherein the articulation joint comprises first and second pivotal support bearings sharing a common substantially vertical rotational axis defining a rotational axis of the joint, the first pivotal support bearing being located vertically spaced apart above the second. For transmitting power between the front section and the rear section of the vehicle a first drive shaft is located between the first support bearing and the second support bearing, whereas a second drive shaft for transmitting power between the front and rear sections of the vehicle is located below the second support bearing. A pair of steering cylinders is coupled between the front and rear sections of the vehicle for selectively articulating the joint. This structure allows for a very compact design of an articulation joint with throughgoing drive shafts.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
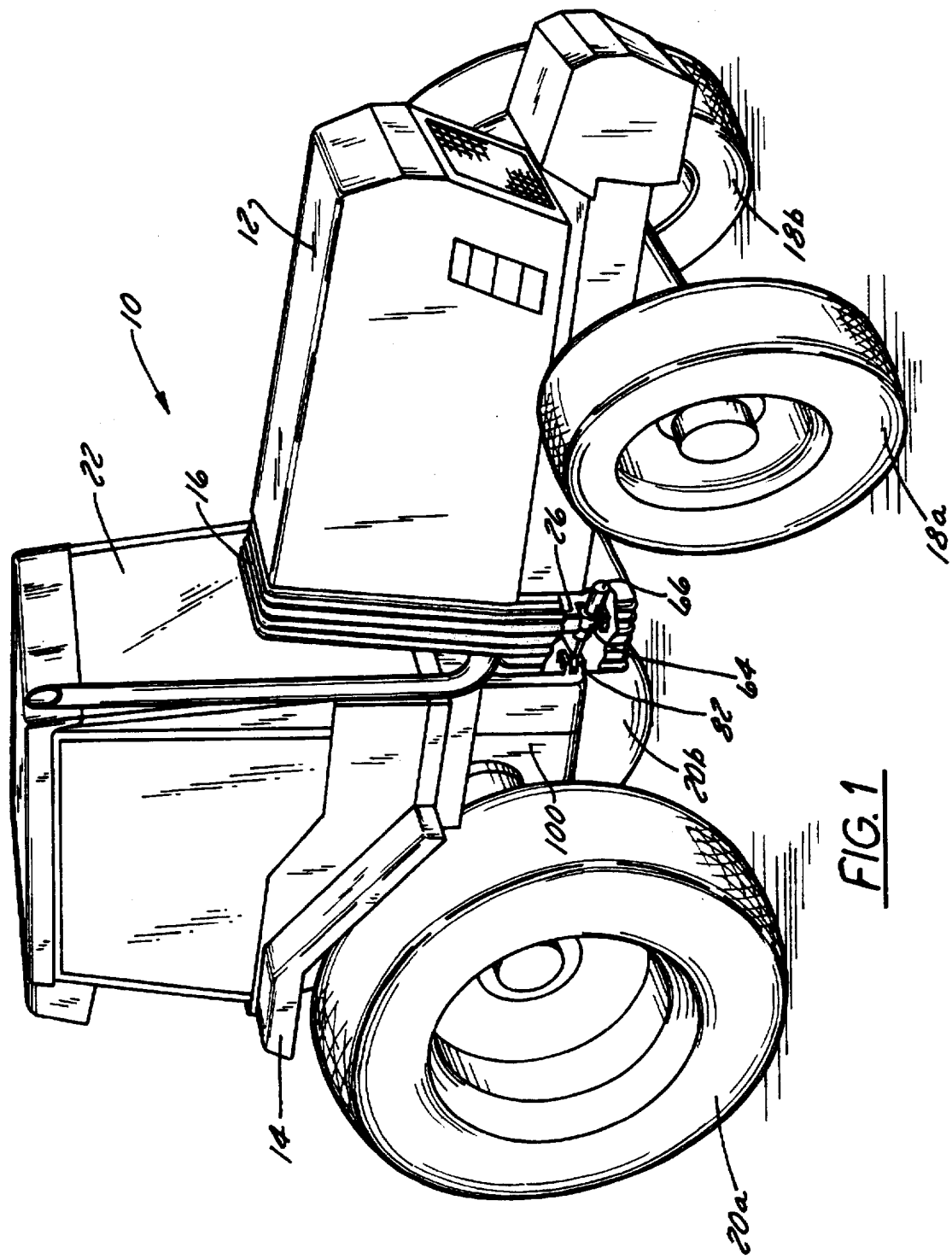
FIG. 1 is a perspective view, partially cut-away, of a tractor including an exemplary articulation joint in accordance with the invention.

Turning now to the drawings and referring to FIG. 1, an articulated work vehicle 10, such as an agricultural tractor, is indicated in a perspective view. Tractor 10 comprises a front section 12 and a rear section 14 pivotally coupled to one another by an articulation joint 16. Front section 12 includes front wheels 18a and 18b, while rear section 14 includes rear wheels 20a and 20b. On rear section 14, an operator's compartment or cab 22 is provided for housing operator controls (not shown), including a steering wheel, engine and subsystem controls and the like, which may be of generally known design.

Figure 2:
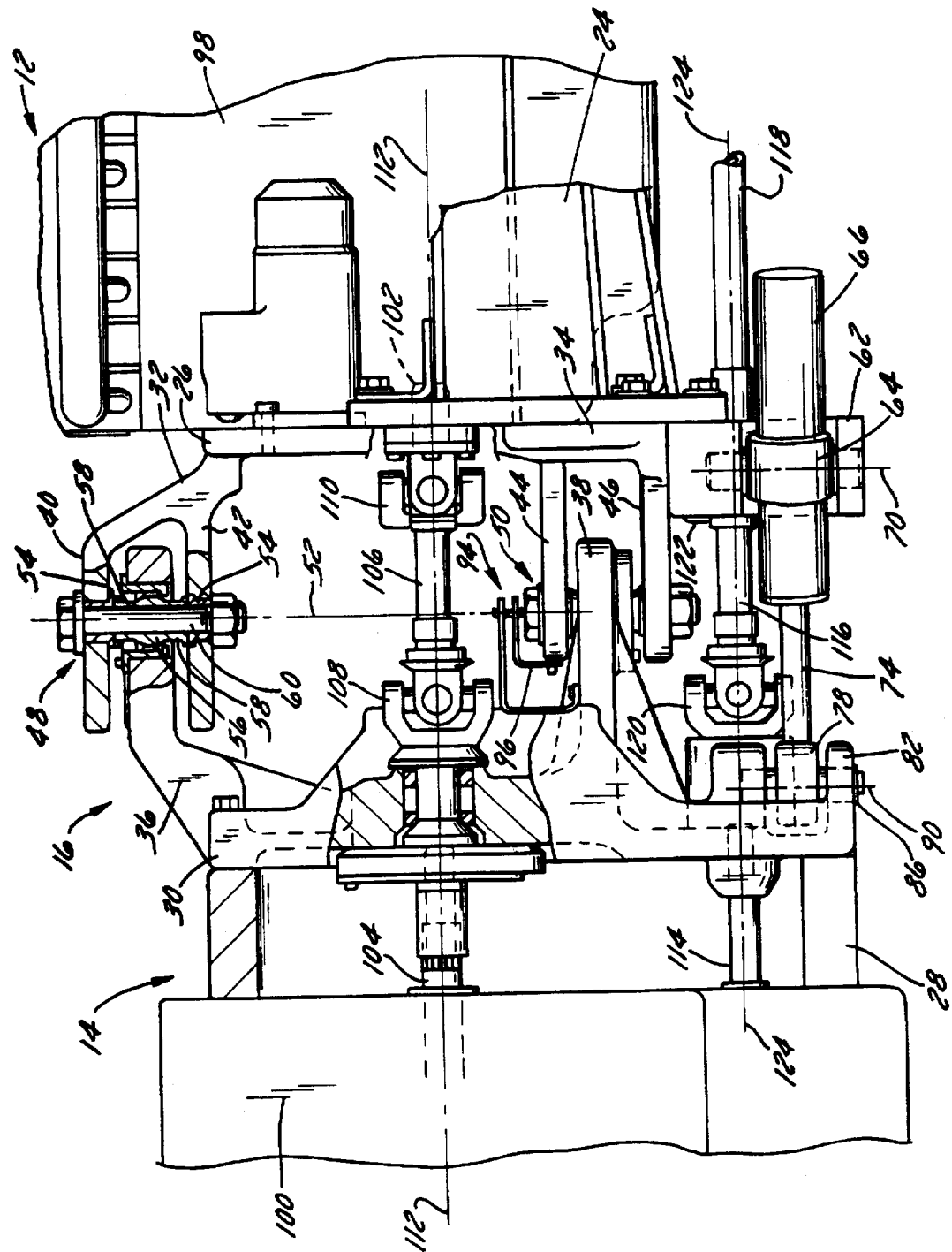
FIG. 2 is a side view, partially in section, of the articulation joint of FIG. 1, illustrating the preferred spacial relationship between the elements of the joint.

Referring to FIG. 2, articulation joint 16 for tractor 10 is shown in a partially sectioned side view. Front section 12 includes a front frame 24 supporting a front articulation joint interface bracket 26. Similarly, rear section 14 includes a rear frame 28 supporting a rear articulation joint interface bracket 30. Front bearing supports 32 and 34 extend rearwardly from front interface bracket 26 and join rear bearing supports 36 and 38 extending forwardly from rear interface bracket 30. As shown in FIG. 2, front bearing supports 32 and 34 are preferably formed as upper and lower clevis members 40, 42, 44, 46, whereas rear bearing supports 36 and 38 comprise tang or tongue-shaped members extending between the upper and lower clevis members of front bearing supports 32 and 34 in joint 16. While this clevis-and-tang arrangement provides the desired support structure for bearing assemblies, as described below, variations on this particular structure may be envisioned by those skilled in the art without departing from the intended scope of the appended claims.

Front section 12 is pivotally coupled to rear section 14 through engagement of upper and lower pivotal support bearings 48 and 50, respectively, disposed between front bearing supports 32, 34 and rear bearing supports 36, 38. Bearings 48 and 50 are free to rotate about a common, generally vertical axis 52, that defines the pivotal axis of joint 16 and tractor 10. Moreover, support bearings 48 and 50 are vertically spaced from one another to provide structural strength to joint 16 and tractor 10 against bending moments arising from the weight of the front and rear sections 12 and 14 of tractor 10 and from other forces present at articulation joint 16.

As shown for upper support bearing 48 in FIG. 2, each bearing 48, 50 includes a pair of journals 54 fitted within upper and lower clevis members 40, 42, 44, 46 of front bearing support 32 and 34, a journal 56 fitted within rear bearing supports 36 and 38, and spacers 58 fitted between the interlocking members 40, 42, 32 and 44, 46, 38 of each pair of front and rear bearing supports 32, 36 and 34, 38. An axle or pivot pin 60, such as a bolt, maintains bearings 48 and 50 in tight compression and resists bending moments exerted by the bearing supports on the journals of each bearing. As will be appreciated to those skilled in the art, each bearing is also provided with grease fittings and seals (not shown) for protecting the bearing assembly from excessive wear and deterioration.

Front interface bracket 26 includes a pair of support mounts 62 (one visible in FIG. 2) for pivotally mounting steering actuators 66 and 68 (one visible in FIG. 2), such as hydraulic steering cylinders. Actuators 66 and 68 are preferably trunnion mounted hydraulic actuators supported in mounts 62 by trunnions 64 for pivotal movement about substantially vertical axes 70 and 72 (see FIGS. 3 and 4) as joint 16 is articulated as described more fully below. Each steering actuator 66, 68 includes a rod 74, 76, respectively, having a tang end 78, 80 held pivotally in a corresponding rod-end support 82, 84 provided in rear interface bracket 30. Clevis pins 86, 88 or similar load-bearing fasteners serve to couple tang ends 78, 80 of actuators 66 and 68 to their mating rod-end supports 82, 84 and hold tang ends 78, 80 pivotally about substantially vertical rotational axes 90, 92. Actuators 66 and 68 are fluid coupled to a steering hydraulic system (not shown), which may be of generally known design, and, in operation, receive pressurized fluid causing extension and retraction of rods 74, 76 forcing rotation of articulation joint 16 as described in detail below.

An angular position sensor 94 is provided between front and rear sections 12 and 14 for sensing the relative angular orientation of joint 16 and generating a steering angle signal representative thereof. In the preferred embodiment shown in FIG. 2, sensor 94 is mounted on suitable brackets 96 above bearing 50. Sensor 94 may be any suitable type of device, such as a rotary potentiometer. As will be appreciated by those skilled in the art, sensor 94 supplies the steering angle signal to a steering control system (not shown) that, based upon the steering direction desired by an operator, typically sensed from the position of a steering wheel in cab 22, commands a hydraulic steering system to direct pressurized fluid to actuators 66 and 68 to articulate tractor 10. The steering control system itself may be of any known design, such as the control systems described in U.S. Pat. No. 4,771,851 or U.S. Pat. No. 4,802,545, both of which are incorporated by reference herein, Generally, in such systems steering within a relatively small angles from a forward direction is achieved solely through pivoting of an independent steering axle or by turning the front wheels 18a, 18b or rear wheels 20a, 20b only, whereas steering to larger angles from a forward direction is accomplished by a combination of conventional wheel steering and articulation.

As best illustrated in FIG. 2, tractor 10 includes an engine 98 supported in front section 12, supported on frame 24 in a conventional manner. Engine 98 provides power for driving rear wheels 20a and 20b through a transmission 100 supported in rear section 14 on frame 28 by suitable support brackets (not shown). Engine 98 includes an output drive shaft 102 for transmitting power to transmission 100, while transmission 100 includes an input shaft 104 for receiving power from engine 98. Engine output shaft 102 is mechanically coupled to transmission input shaft 104 through a first drive shaft 106 traversing joint 16 between bearings 48 and 50. Drive shaft 106 passes through interface brackets 26 and 36 and includes universal-type couplings 108 and 110, permitting, transmission of power from engine shaft 102 to transmission shaft 104, while allowing for changes in angular orientation of drive shaft 106 as joint 16 is articulated about axis 52. Drive shaft 106 preferably comprises a pair of tubular members telescopingly assembled to permit slight changes in length as joint 16 is pivoted, in a manner generally known in the art. Engine output shaft 102, transmission input shaft 104 and drive shaft 106 preferably lie substantially in a common, generally horizontal plane 112, permitting direct transmission of power from engine 98 to transmission 100 as joint 16 is articulated as described below. Transmission 100 is engaged and disengaged to drive rear wheels 20a and 20b through a suitable differential (not shown) in a manner well known in the art.

In addition to input shaft 104, transmission 100 includes an output shaft 114 for selectively directing power from rear section 14 back to front section 12 for driving front wheels 18a and 18b. Shaft 114 is typically selectively engageable either manually or by an automatic control system. A second drive shaft 116 is coupled to transmission output shaft 114 and traverses joint 16 for transmitting power from transmission 100 to a front wheel drive shaft 118 in front section 12. Second drive shaft 116 may be substantially identical to first drive shaft 106 and includes universal-type joints 120 and 122 permitting transmission of power, while allowing for angular displacement of shaft 116 as joint 16 is articulated. Transmission output shaft 114, drive shaft 116 and front wheel drive shaft 118 lie substantially within a common, generally horizontal plane 124. Front wheel drive shaft 118 is coupled to a front-wheel drive train (not shown) of generally known design, for driving front wheels 18a and 18b.

Articulation joint 16 as illustrated in FIGS. 1 and 2 is particularly suitable for use in small and medium horsepower work vehicles, in which the overall envelope length of the joint must be kept to a minimum, permitting tight steering, such as at a field headland. It should be noted that the use of trunnion-mounted actuators 66 and 68 permits joint 16 to be articulated through a considerable displacement angle (as discussed in greater detail below), while maintaining a short envelope length for the joint. Such actuators also provide the advantage of reducing column loading as compared to clevis-mounted actuators of the type used in known articulation joints in such vehicles. In addition, the particular placement of drive shafts 106 and 116 in the preferred embodiment illustrated in FIG. 2 permits power to be efficiently transmitted both from front section 12 rearwardly and from rear section 14 forwardly through joint 16 without the need for "drop boxes" or similar structures necessary in many known articulation joints for aligning throughgoing drive shafts with transmission elements on either side of the joint. Moreover, it has been found that the placement of actuators 66 and 68 below the other elements of joint 16 improves the overall ground clearance of the joint without sacrificing other advantages summarized above.

Figure 3:
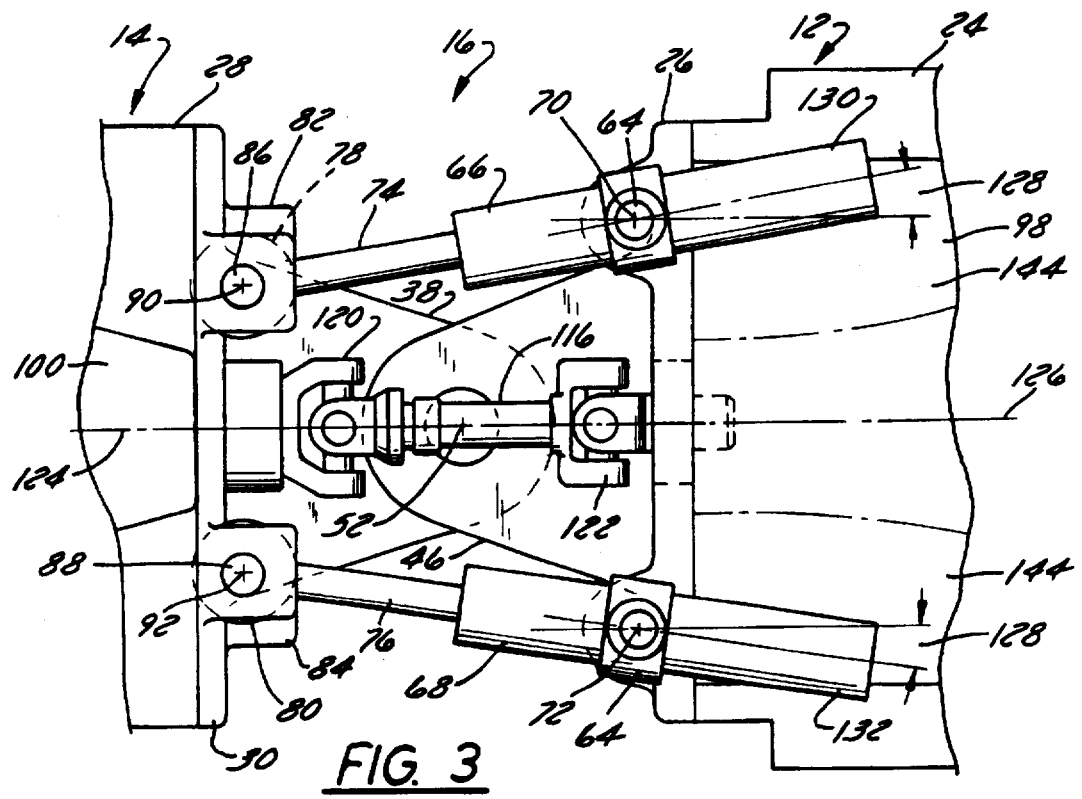
FIG. 3 is a bottom view of the articulation joint illustrated in FIG. 1, wherein the joint is in an aligned (i.e. unarticulated) position.
Figure 4:
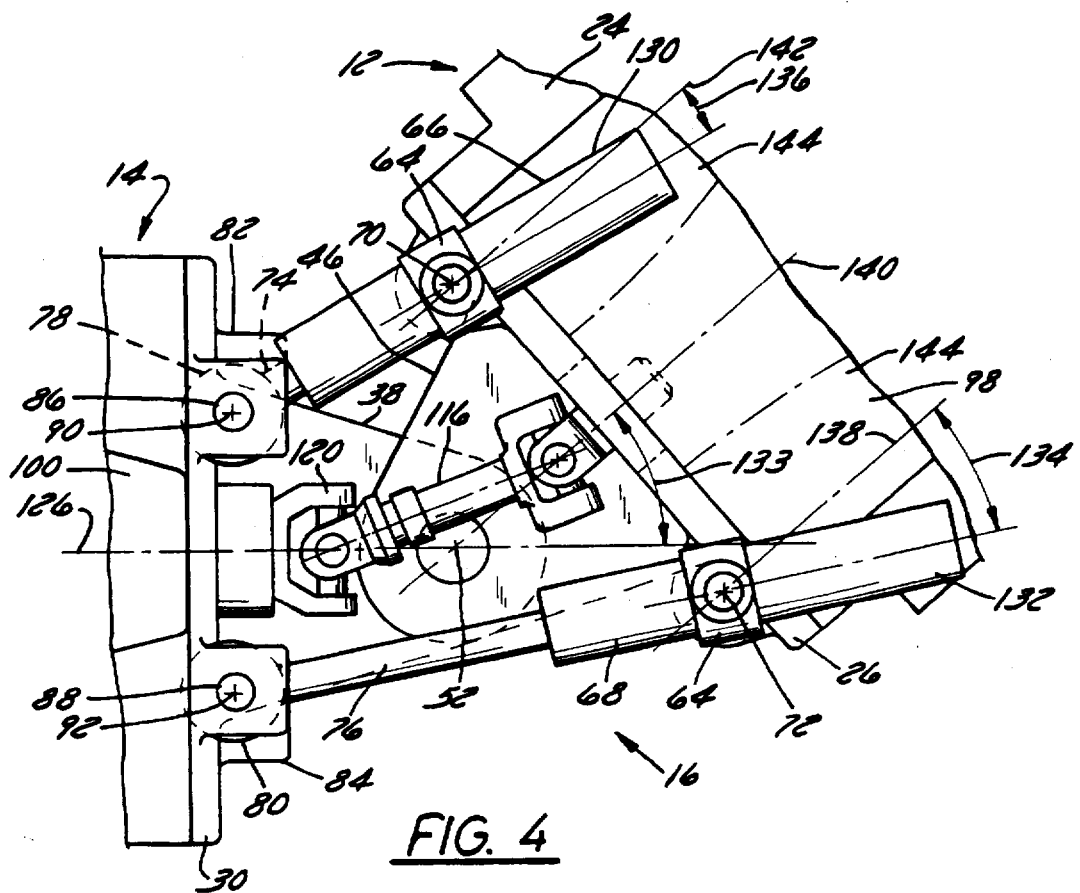
FIG. 4 is a bottom view as in FIG. 1, showing the articulation joint in an articulated position.

In operation, articulation joint 16 may be pivoted from a centered or aligned position as illustrated in FIG. 3 to a maximum articulation angle as shown in FIG. 4 by extension and retraction of actuators 66 and 68. Although full articulation is illustrated in only one direction in FIG. 4 for simplicity, it should be understood that identical articulation is provided to both sides of a tractor centerline indicated by line 126 in FIGS. 3 and 4.

As shown in FIG. 3, when actuators 66 and 68 are extended equally, joint 16 is assumes an centered position wherein front and rear sections 12 and 14 are aligned along tractor centerline 126. In this centered position, drive shafts 106 and 116 (the latter only being visible in FIGS. 3 and 4) also lie generally along centerline 126. It should be noted that in the presently preferred embodiment illustrated, actuators 66 and 68 are angled slightly with respect to centerline 126 in the aligned position of joint 16, as indicated by reference numeral 128 in FIG. 3, with cap ends 130 and 132 of each actuator 66, 68 extending outboard with respect to the position of their respective trunnions 64.

From the aligned position shown in FIG. 3, joint 16 may be forced to a fully articulated position by extension of one actuator and retraction of the other, as shown in FIG. 4. In FIG. 4, actuator 68 is shown in its fully extended position, while actuator 66 is shown fully retacted. In the presently preferred embodiment, full articulation displaces front section 12 with respect to rear section 14 approximately 40 degrees from centerline 126, as indicated at angle 133 in FIG. 4. As actuators 66 and 68 are extended and retracted, they rotate about axes 70 and 72 respectively, the extended actuator 68 swinging its cap end 132 farther outboard as compared to its angular orientation in the aligned position, and the retracted actuator 66 swinging its cap end 130 inboard. As indicated by angles 134 and 136 in FIG. 4, in the presently preferred embodiment, cap end 132 of the extended actuator 68 is oriented approximately 28 degrees outboard with respect to a front-to-back line 138 parallel to a centerline 140 of front section 12, whereas cap end 130 of retracted actuator 66 is oriented approximately 19 degrees inboard with respect to a similar front-to-back line 142. Thus, cap ends 130 and 132 sweep through approximately 47 degrees as joint 16 is pivoted between its fully articulated positions on either side of centerline 126. It should also be noted that drive shafts 106 and 116 pivot with respect to their aligned positions as joint 16 is articulated. However, due to the alignment of shafts 106 and 116 with corresponding drive train elements in front and rear sections 12 and 14 as described above, shafts 106 and 116 remain substantially in common planes with these elements throughout their pivotal movements.

To accommodate the sweep of cap ends 130 and 132 of actuators 66 and 68 as joint 16 is articulated, frame 124 is preferably configured to lie above the level of ends 130 and 132, at least in a region adjacent to front interface bracket 26. Alternatively, frame 124 may be configured to include a lateral relief or volume into which cap ends 130 and 132 may sweep when moving inboard during steering, as illustrated generally at regions 144 in FIGS. 3 and 4.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the free volume provided for allowing the steering actuators to pivot could be provided at any level of the vehicle and is not restricted to an open area at the bottom of the frame. Furthermore, the steering actuators could be mounted in reversed direction, i.e. with the actuator barrel coupled to the rear frame and the piston rod coupled to the front frame. Moreover, the term "trunnion" is intended to refer to pivotal supports of any type that may support the actuators, other than pivotal supports located at the cap end of the actuators, such as clevis or tang mounts. While such trunnions are typically mounted in a position intermediate the cap and rod ends of the actuators, they may be located adjacent to the rod end or at various locations along the actuator barrel.

We claim:

1. A work vehicle comprising:

an engine supported in a first section;

a transmission supported in a second section;

first and second pivotal support bearings intersecting a common plane and sharing a common substantially vertical rotational axis defining a rotational axis of an articulation joint pivotally coupling the first section to the second section;

a first drive train intersecting the common plane and extending through the joint below the first support bearing and above the second support bearing, the first drive train being coupled to the engine and to the transmission for transmitting drive power between the engine and the transmission;

a second drive train intersecting the common plane and extending through the joint below the second support bearing, the second drive train being coupled to the transmission and to drive elements in the first section for driving wheels supporting the first section; and a pair of steering actuators coupled between the first and second sections of the vehicle for selectively articulating the joint.

2. The vehicle of claim 1, wherein the vehicle includes a frame and a pair of trunnion supports for pivotally supporting the steering actuators, the frame being configured such that free volume is provided adjacent to portions of the actuators extending from the trunnion supports, the free volume permitting pivotal movement of the actuators during articulation of the articulation joint.

3. The vehicle of claim 1, wherein each steering actuator includes a trunnion and an extendable and retractable rod, the trunnion of each actuator being supported on the first section of the vehicle and the rod of each actuator being coupled to the second section of the vehicle, and wherein the engine is supported on a frame, the engine and the frame being positioned such that a free volume is provided around each steering actuator to allow pivotal movement of each steering actuator on its trunnion during articulation of the joint.

4. The vehicle of claim 1, wherein each steering actuator includes a trunnion and an extendable and retractable rod, the trunnion of each actuator being supported on the second section of the vehicle and the rod of each actuator being coupled to the first section of the vehicle, and wherein the transmission is supported on a frame, the frame and transmission being arranged such that a free volume is provided around each steering actuator to allow pivotal movement of each steering actuator on its trunnion during articulation of the joint.

5. The vehicle of claim 1, wherein the steering actuators are located on the vehicle on a level below both pivotal support bearings.

6. A work vehicle comprising:

a front section supporting an engine;

a rear section supporting a transmission, the front section being joined to the rear section by an articulation joint;

first and second pivotal support bearings sharing a common substantially vertical rotational axis defining a rotational axis of the joint and defining a first substantially vertical plane;

a first drive shaft extending below the first support bearing and above the second support bearing and intersecting the first vertical plane and extending through the joint for transmitting drive power between the engine and the transmission for driving the transmission, a second drive shaft extending below the second support bearing and intersecting the first vertical plane and extending through the joint for transmitting drive power between the transmission and driven wheels supporting the front section, the first drive shaft lying substantially in a second common plane with first drive train elements in the front and rear sections of the vehicle and the second drive shaft lying substantially in a third common plane with second drive train elements in the front and rear sections of the vehicle, the second and third planes being vertically spaced from one another and substantially perpendicular to the rotational axis; and a pair of steering actuators coupled between the front and rear sections of the vehicle for selectively articulating the joint.

7. The vehicle of claim 6, wherein the transmission provides drive power for rear wheels supporting the rear section of the vehicle.

8. The vehicle of claim 6, wherein the first plane is located between the first and second pivotal support bearings, and the second plane is located below the first and second pivotal support bearings.

9. The vehicle of claim 6, wherein the steering actuators are positioned below the first and second planes.

10. A work vehicle having an articulation joint between a front section and a rear section of the vehicle, the articulation joint comprising:

first and second pivotal support bearings intersecting a common plane and sharing a common substantially vertical rotational axis defining a rotational axis of the joint, the first pivotal support bearing being vertically spaced above the second support bearing;

a first drive shaft for transmitting power between the front and rear sections of the vehicle, the first drive shaft being located between the first support bearing and the second support bearing and intersecting the common plane;

a second drive shaft for transmitting power between the front and rear sections of the vehicle, the second drive shaft being located below the second support bearing and intersecting the common plane; and a pair of steering actuators coupled between the front and rear sections of the vehicle for selectively articulating the joint.

11. The vehicle of claim 10, wherein the steering actuators are positioned below the second drive shaft.

12. The vehicle of claim 10, wherein the first drive shaft lies substantially in a first common plane with first mating transmission elements in the front and rear sections of the vehicle and the second drive shaft lies substantially in a second common plane with second mating transmission elements in the front and rear sections of the vehicle.

13. The vehicle of claim 12, wherein the first mating transmission elements lying in the first common plane include an engine output shaft and a transmission input shaft, and the second mating elements lying in the second common plane include a transmission output shaft and a front wheel drive shaft.

* * * * *